(No Model.)
M. V. B. ETHRIDGE.
METHOD OF MAKING SPINDLES FOR TIME PIECE DIALS.
No. 350,671.          Patented Oct. 12, 1886.
Fig. 1.
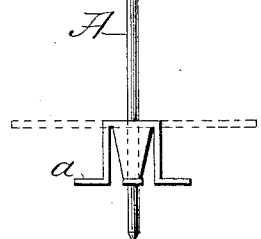
Fig. 5.    Fig. 2.
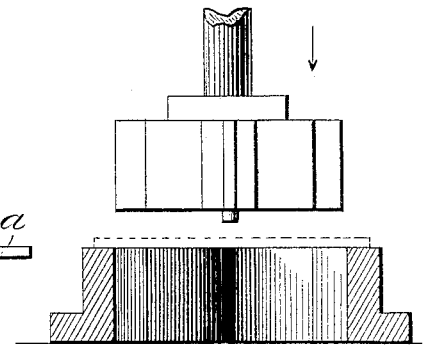
Fig. 4.
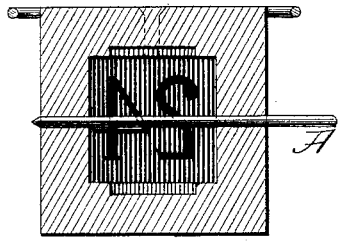
Fig. 3.
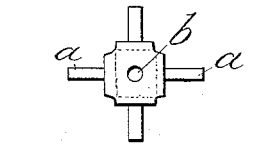
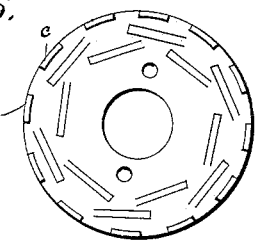
Fig. 6.    Fig. 7.
Attest:
F. H. Schott
Fred E. Tasker
Inventor:
Martin V. B. Ethridge
by John E. Tasker
atty.

UNITED STATES PATENT OFFICE.

MARTIN V. B. ETHRIDGE, OF BOSTON, MASSACHUSETTS, ASSIGNOR OF TWO-THIRDS TO JOHN SWANN, OF NEW YORK, N. Y., AND HENRY E. WAITE, OF WEST NEWTON, MASSACHUSETTS.

METHOD OF MAKING SPINDLES FOR TIME-PIECE DIALS.

SPECIFICATION forming part of Letters Patent No. 350,671, dated October 12, 1886.

Application filed December 7, 1885. Serial No. 184,976. (No model.)

*To all whom it may concern:*

Be it known that I, MARTIN V. B. ETHRIDGE, a citizen of the United States, residing at Boston, in the county of Suffolk and State of Massachusetts, have invented certain new and useful Improvements in Methods of Making Spindles for Time-Piece Dials; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an improvement in the method of making spindles for time-piece dials—such spindles in particular as are described and shown in my former Patent No. 319,804 June 9, 1885—the object being to provide a method whereby such spindles may be made rapidly, cheaply, and in large quantities; and my invention consists in a series of steps, which will be hereinafter fully set forth and claimed.

In the annexed drawings, illustrating one example of carrying out my process, Figure 1 is a front view of a spindle constructed after my improved process. Fig. 2 is a view of the turnstile-plate before it is bent into the shape to be attached to the spindle. Fig. 3 is a top plan view of the turnstile after it is bent into shape to be affixed to the spindle. Fig. 4 shows any ordinary form of punch and die for stamping out the turnstile-plates. Fig. 5 is a mold for fashioning the numeral blocks. Fig. 6 is a view of the plate provided with springs for holding the spindles in position and with peripheral projections, and Fig. 7 is an end view of the same.

Like letters designate like parts in the several views.

In the patent above referred to there is shown a radial series of rotary spindles, each carrying a block, plate, or disk on the face of which are delineated numerals representing the hours, and each carrying also a turnstile arrangement, by means of which the said spindles are consecutively rotated under the action of a centrally-located mechanism, and each held in the desired position by a spring. It becomes, therefore, a matter of importance to construct these spindles as cheaply as possible, in order to thereby lessen the cost of the dial plate entire. The first requisite, therefore, of such a process is to provide a rod of proper length and size, which may be provided with blocks and turnstiles to form the spindle described. This rod may be made of metal or wood, and may be made in any desired manner. No means is here shown for making the rods, as the simplicity of this element of the spindle obviously does not demand it. This rod A is provided at or near one end with a block made of any suitable material and having raised figures on the faces. This block may be made in a mold similar to that represented in Fig. 5; or the mold may be of any different and approved construction, the only essential being that it shall be of a shape adapted to impart to the block a rectangular form, provided the block is to be of rectangular shape, or to impart to it any other form, as desired; but in every and all cases the mold must fashion the block, plate, or disk with figures more or less raised from the several faces thereof, in order that said figures may be colored or painted quickly, which figures indicate the hours of the day; and it is evident also that different molds will be needed for the different blocks according as the different numerals are to be molded thereon. The material to be used in this molding process may be of any plastic sort, provided it has adhesive qualities to enable the block to be molded firmly upon the spindle, the latter passing through the middle of it.

The turnstiles with which the spindles are to be provided are punched from a piece of sheet metal into the form shown in Fig. 2. For this purpose any ordinary punch and die which will give the metal the shape required will be sufficient, and in Fig. 4 one form of die and punch which may be conveniently employed is shown. The shape of this metal blank which is to form the turnstile is that of a cross having the edges of its arms slightly tapering, if desired, and having each arm provided on its end with a projecting pin or lug,

*a*. The center of the cross is pierced with an aperture, *b*, about the size of the rod A of the spindle. The metallic plate thus shaped has its arms bent up until they meet each other, or in such a manner as to leave a square plate having a central perforation at about right angles to the arms. Then the pins *a* are bent out at right angles to the arms of the cross. The turnstile is now ready to be attached to the rod A, which is done by passing this rod through the aperture *b*, and then soldering the turnstile firmly to the rod. When thus attached to the rod it will have the form shown in Figs. 1 and 3.

In my former patent of June 9, 1885, the spindles are shown as secured in position by separate springs. This series of springs may, however, be easily made by taking a circular disk of sheet spring metal and punching out strips therefrom, which strips are not entirely disconnected from the disk, but are still connected thereto at one end, and they are then bent up so as to act as springs. The plate carrying these springs may be easily attached to the clock or watch by a couple of screws or rivets, as shown in Fig. 6.

In addition to striking up the spring-strips from the disk I form the periphery of the disk with a series of projections, *c*, bent up at an angle to the plane of the disk, as shown in Figs. 6 and 7. These are likewise struck from the plate. They are for the purpose of regulating the friction of the revolving pin shown in the above-named patent of June 9, 1885, which actuates the spindles, for when the pin is turning one of the blocks it requires some power, and when the pin leaves the turnstile it is desirable to have it rub on the edge of one of these sections with about the same force that is required to move the turnstile, thus giving as nearly as possible a continuous and regular movement of the pin. We can then govern the mainspring accordingly.

Having thus described my invention, what I claim as new, and desire to secure by Letters Patent, is—

1. The herein-described method of making spindles for time-piece dials, which consists in providing rods with plastic numeral blocks molded thereon, and also with turnstiles punched from sheet metal bent into the required shape and attached thereto, substantially as shown and described.

2. The herein-described method of making spindles for time-piece dials, which consists in molding upon a rod plastic blocks having raised figures on the surface of said blocks, substantially as and for the purpose described.

In testimony whereof I affix my signature in presence of two witnesses.

MARTIN V. B. ETHRIDGE.

Witnesses:
CHARLES NICHOLS,
CHAS. HALL ADAMS.